United States Patent Office 2,817,622
Patented Dec. 24, 1957

2,817,622

COMPOSITIONS HAVING JOINT INSECTICIDAL AND BACTERICIDAL ACTION

Albert Obladen, Hamburg-Gross Flottbek, and Martin Deutsch, Hamburg-Wandsbek, Germany, assignors, by mesne assignments, to Lehn & Fink Products Corporation, a corporation of Delaware No Drawing. Application May 19, 1954,
Serial No. 431,000

10 Claims. (Cl. 167—30)

This invention relates to compositions having joint insecticidal and bactericidal action.

The use of compositions in liquid commercial form having joint insecticidal and bactericidal action is known. Thus, p-p'-dichloro-diphenyl-trichloro-methyl-methane or hexachloro-cyclohexane have been employed with cresol, with the addition of sulphonated hydrocarbons as emulsifiers, it being necessary to ensure that the pH value did not substantially exceed the value 7. Otherwise, a splitting off of the loosely bound chlorine atoms of both substances having insecticidal action occurs, which results in a severe drop in efficacy. Now, most known disinfectants are, however, adjusted to the alkaline side, and there come into consideration therefore particularly those effective substances which can be readily worked into the existing types of disinfectant and are alkali-insensitive.

It has been found that mixtures of chlorinated phenyl-benzyl ethers of the general formula

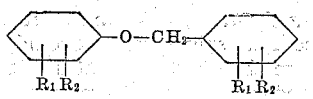

having insecticidal action and of known bactericidal substances, in certain cases with the employment of emulsifying agents, constitute preparations which possess a complex insecticidal and bactericidal action and can be employed in a wide field of application as pest destroyers.

In this formula $R_1$ and $R_2$ denote hydrogen atoms or chlorine atoms, at least one of said substituents being chlorine.

The pH value of the preparations in accordance with the invention can be adjusted as desired, and the limitations which have to be observed in the case of p-p'-dichloro-diphenyl-trichloro-methyl-methane and hexachlorocyclohexane do not apply. The new preparations can be diluted with water as desired, and it is possible, by a single moistening of the objects from which the pests are to be eradicated, to kill simultaneously all types of insects and small organisms of a bacterial nature which occur thereon.

The known monovalent and polyvalent phenols frequently used in disinfectants are especially suitable as the substances having bactericidal action in the mixtures according to the invention. Examples are phenol, cresol, xylenol, thymol, carvacrol, dihydroxy-diphenyl, phenyl-phenol, benzyl-phenol and all position-isomers and halogen substitution products thereof. The phenols may be used in pure form or as technical mixtures and also as combinations of several types of phenol in order to obtain a wider range of action.

The combined known properties of several phenol derivatives can be employed advantageously here.

Special reference should be made to the fact that other known disinfectants can also be employed in the preparations according to the invention. Examples are:

(a) Alcohols in the form of methyl-, ethyl-, and n-propylalcohol and derivatives thereof, (b) Aldehydes in the form of formaldehyde and other aliphatic, aromatic, and heterocyclic aldehydes and derivatives thereof, (c) Active chlorine in the form of hypochlorite, chloride of lime, chloramine, and other derivatives, (d) Mercury compounds in the form of sublimate and organic mercury salts, (e) Cation-active salts of nitrogenous compounds which contain per molecule at least one long-chain hydrocarbon residue, linked to nitrogen, (f) Cation-active quaternary ammonium or phosphonium compounds which contain, in addition to any desired substituents, at least one long-chain hydrocarbon residue, linked to the co-ordination centre (the anion may be of any desired nature), (g) Compounds of the type of the so-called ampholyte soaps, which possess bactericidal properties, for example in the form of bis(octyl-aminoethyl)-glycinhydrochloride.

Halogen-substituted phenyl-benzyl-ethers are especially considered as the substances having effective insecticidal action, the chlorine substitution products possessing especial importance. It should be pointed out that unhalogenated, or in some cases alkylated, basic compounds of this class are also fairly effective.

It is preferable to use the following:

2-chlorophenyl-benzylether
4-chlorophenyl-benzylether
2.4-dichlorophenyl-benzylether
2.4.5-trichlorophenyl-benzylether
2.4.6-trichlorophenyl-benzylether
2.3.4.5.6-pentachlorophenyl-benzylether
2-chlorophenyl-2'-chloro-benzylether
4-chlorophenyl-2'-chloro-benzylether
2.4-dichlorophenyl-2'-chloro-benzylether
2.4.5-trichlorophenyl-2'-chloro-benzylether
2.4.6-trichlorophenyl-2'-chloro-benzylether
2.3.4.5.6-pentachlorophenyl-2'-chloro-benzylether
2-chlorophenyl-4'-chloro-benzylether
4-chlorophenyl-4'-chloro-benzylether
2.4-dichlorophenyl-4'-chloro-benzylether
2.4.5-trichlorophenyl-4'-chloro-benzylether
2.4.6-trichlorophenyl-4'-chloro-benzylether
2.3.4.5.6-pentachlorophenyl-4'-chloro-benzylether
2-chloro-4-methyl-phenyl-benzylether
4-chloro-2-methyl-phenyl-benzylether
4-chloro-3-methyl-phenyl-benzylether and
4-chloro-3.5-dimethyl-phenyl-benzylether.

4-chlorophenyl-2'-chloro-benzylether is particularly suitable on account of the low melting point. As the substances with insecticidal action and part of the substances with bactericidal action to be used according to the invention are practically insoluble in water, the addition of emulsifying agents is recommended in such cases. The known water-soluble surface-active substances which are of importance as washing agents and auxiliary textile cleaning agents, and which are capable of producing a colloidal dispersion of water-insoluble substances in a solvent are chiefly considered for this purpose. In selecting an appropriate emulsifying agent, the nature of the ionic activity of the emulsifying agent must be compatible with the cationic or anionic activity of the disinfecting components, since cationic and anionic agents should not be combined with each other.

Examples of suitable emulsifiers are the well known soaps, i. e., the fatty acid salts, in the form of the amine, or sodium or other alkali metal salts, obtained from saponification products of vegetable or animal oils and fats. Also suitable are the salts of long-chain carboxylic acids which are similar to soaps obtained from fats and in which the alkyl residues of these acids may in certain cases be interrupted by heteroatoms such as oxygen, nitrogen or sulphur; for example, the salts of alkyl ether carboxylic acids or of alkyl-aryl ether carboxylic acids.

Further suitable emulsifiers are the salts of all sulphonated hydrocarbons of the aliphatic, aromatic, mixed aliphatic-aromatic and hydro-aromatic series; for example alkylsulphonates, fatty alcohol sulphonates, alkyl-arylsuphonates, alkylnaphthalenesulphonates, and alkyltetrahydronaphthalenesulphonates.

There can also be employed as emulsifiers polyethylene oxide condensation products and condensation products of fatty alcohols or alkylphenols, with a polyethylene oxide chain, especially when using cation-active substances having a bactericidal action, the natural emulsifying capacity of acid substances being in itself, small.

Furthermore, betaines containing at least one long-chain hydrophobic hydrocarbon residue per molecule can be used as emulsifiers in accordance with this invention. In cases in which the substance having a bactericidal action possesses a natural emulsifying action for the substance having an insecticidal action in accordance with the invention, the use of additional emulsifiers may be dispensed with.

Naturally, not only are the individual compounds mentioned suitable, but mixtures of such compounds can also be used, primarily in a combination in which they customarily occur technically. The examples give detailed information concerning the quantitative composition of the mixed preparations according to the invention. It should, however, be pointed out that in general the following mixing ratios lead to favourable results:

5–1% of the substance having an effective insecticidal action
5–10% of the substance having an effective bactericidal action
10–30% of emulsifier
10–20% of alcoholic solvent
Water to 100%

All references herein to proportions or to parts are by weight.

The components of the mixture according to the invention, can be employed dissolved either in water or in organic solvents. In the first case, the addition to the aqueous solution of an alcoholic solvent is advisable especially for obtaining a solidifying point which is as low as possible. Methylalcohol, ethylalcohol, n-propylalcohol, isopropyl and similar alcohols may suitably be employed.

Further additions may be made to the preparations according to the invention if it is desired to use the preparations in special circumstances or if such additions are desirable from a practical point of view; or for economic reasons; for example, fillers and diluents of all kinds.

The production of the new preparations may, for example, be effected by preparing the emulsifier substance, in the form of soap for instance, in a mixing vessel or by placing it first therein, as a completely preformed alkali metal salt of a sulphonated hydrocarbon and adding a quantity of water such that a concentrated emulsifier solution is obtained. The substances having insecticidal action and the substances having bactericidal action for example, phenol derivatives are then added; alcoholic solvent is then also added, and the resultant mixture is heated for one hour to about 50° C., with vigorous stirring. After cooling, water to 100 parts is added, or the mixture is supplemented with further additions, in the form of odour-correcting agents for example. The pest destroyer thus obtained constitutes a viscous, clear, and foaming liquid which may be mixed with water in any desired ratio and which, preferably used as ½ to 5% solutions, is suitable for all kinds of pest-destroying purposes. In the event of soap being used as the emulsifier, the diluted composition is readily soluble in water and has a weakly alkaline reaction. By reason of the content of surface-active substance, the preparations possess a good cleansing action and are therefore particularly highly suitable for all pest destruction purposes. Thus the especial economy and advantage of the new preparations, which produce a complex effect, becomes apparent in comparison with agents which only eliminate one type of pest or the other and consequently act selectively. By reason of the low concentrations required for use, the effectiveness of the mixed preparations according to the invention is equal to that of the conventional preparations used for the exclusive killing of bacteria.

On the one hand, the mixtures according to the invention are suitable for killing all known types of bacteria and thus constitute highly effective disinfectants. Thus, amongst other organisms, *Staphylococcus aureus, bacterium coli, Bacterium Pyocyaneum* and *Bacterium proteus* are killed by 5 minutes contact with the 0.5–1% solutions in a suspension experiment at 18° C. On the other hand, fruit flies and grain beetles are killed by solutions of similar concentrations after a period of action lasting only 10 minutes on surfaces which are treated with the 2% solution of the preparation according to the invention. Here, depending on the form of preparation, the falling time and the death time can differ. Whereas the falling time generally amounts to ½ to 1 hour, the death time may extend to about 15 hours. The ultimate lethal result of the application of such preparations is, however, assured under all circumstances. It is scientifically proved that the new effective substances are to be considered as contact insecticides and assure the same result as the known insecticidal substances mentioned above.

The insecticidal action of the new type of phenylbenzylethers has already been described, and it has been established that the range of action corresponds to that of known insecticidal substances. It could not, however, be deduced from this statement that it would be readily possible to produce compound preparations which are particularly valuable in practice and which at the same time also have a bactericidal action. It had to be assumed that either the insecticidal component would be interfered with by the bactericidal component or vice versa. If the liquid type of preparation is chosen, with the co-employment of surface-active substances as emulsifiers, the compound preparations show the specific effects belonging to their individual components without a reciprocal decrease in effect of one component or the other occurring. This result is entirely surprising, especially in view of the stability of the new insecticidal substances in alkaline surroundings and consequently completely novel preparations having novel practical applications are provided.

*Example 1*

10 parts of the chlorobenzylate of dimethylaminoacetic acid-dodecyl amide are mixed with 10 parts of 4-chlorophenyl-2'-chloro-benzylether, 30 parts of a polyethylene oxyde-condensation product of 1 mole of oleyl alcohol and 12 moles of ethylene oxide and 20 parts of methylglycol as a solvent. When the effective substances are dissolved, water to 100 parts is added to the solution and the mixture is stirred with a moderate use of heat until complete homogeneity is reached.

A viscous, clear liquid of slight natural colouring is obtained which can be diluted with tap water in any desired ratio. The 2% dilution preferably serves as the concentration for use for rendering harmless all types of insects and bacteria which occur. Thus, gram-positive and gram-negative germs, *Staphylococcus aureus, Bacterium coli, Bacterium pyocyaneum,* and *Bacterium proteus,* for example, are killed completely by such a solution in the suspension experiment at room temperature and within a period of action of 5 minutes.

If glass vessels are provided with linings of filter paper which are saturated with the 2% solution and if fruit flies and grain beetles are then placed upon the filter bases pre-treated in this manner, a contact of the insects with the impregnated paper lasting for 10 minutes suffices to assure complete killing within 1–3 hours.

The 0.5 to 5% dilutions of the preparation possess a high wetting, foaming, and cleansing power, enabling them to spread readily in a thin film, even on uneven surfaces.

*Example 2*

10 parts of 4-chlorophenyl-2'chloro-benzylether are dissolved in 50 parts of a polyoxethylated higher molecular weight octadecylamine, 30 parts of water being added at the same time. 10 parts of a quaternary ammonium compound, such as methyl-hydroxyethyl-dodecylhydroxyethyl-benzyl-ammonium chloride are then stirred into the mixture with a moderate use of heat. The mixture is stirred smooth for 1 hour, and yields a product which corresponds in its physical properties, and with regard to biological action, to that described in Example 1.

*Example 3*

5 parts of 4-chlorophenyl-2'-chloro-benzylether, 16 parts of p-chloro-m-cresol, 2.5 parts of o-phenylphenol, and 2.5 parts of benzylphenol are mixed with each other with the simultaneous addition of 12.5 parts of 50% caustic potash solution. 61.5 parts of a mixture of ricinolsulphuric acid ester and polyricinol soap are then added and vigorous stirring is performed, it being possible also to apply heat, until the mass is homogenised.

The 0.5 to 5% solutions of this mixture foam extremely strongly and cleanse efficiently. In its physical properties, the product corresponds to the mixtures described in Examples 1 and 2.

*Example 4*

17 parts of ground nut oil fatty acid and 6 parts of castor oil are saponified with caustic potash solution in the presence of 5 parts of methylglycol to give a neutral product. After the mass has cooled, 5 parts of 4-chlorophenyl-2'-chlorobenzylether, 45 parts of cresol, and 17.1 parts of a 50% caustic potash solution are added and the total weight of the mixture is made up to 100 parts by addition of water. The product is similar in type to those described above.

We claim:

1. A composition having joint insecticidal and bactericidal action and comprising in admixture an insecticidal compound of the general formula

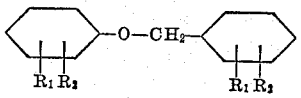

therein $R_1$ and $R_2$ denote residues selected from the group consisting of hydrogen atoms and chlorine atoms, at least one of said substituents being chlorine, and a phenol.

2. A composition having joint insecticidal and bactericidal action and comprising in admixture a phenyl-benzylether and a phenol.

3. A composition having joint insecticidal and bactericidal action and comprising in admixture a chlorinated phenylbenzylether, a phenol and an emulsifying agent.

4. A composition having joint insecticidal and bactericidal action and comprising in admixture a chlorinated phenylbenzylether, a quaternary ammonium compound and a polyethylene oxide derivative.

5. A composition having joint insecticidal and bactericidal action and comprising an aqueous solution containing 5% of 4-chloro-phenyl-2'-chlorobenzylether, 2.5% of o-phenylphenol, 2.5% of benzylphenol, 16% of the potassium salt of p-chloro-m-cresol and 30% of Turkey-red oil, said percentages being percentages by weight of the aqueous solution.

6. A composition having joint insecticidal and bactericidal action and comprising an aqueous solution containing 5% of 4-chloro-phenyl-2'-chloro-benzyl ether, 10% of dimethylbenzyl-dodecyl ammonium chloride, and 30% of the condensation product of 1 mole of dodecylalcohol with 12 moles of ethylene oxide, said percentages being percentages by weight of the aqueous solution.

7. A composition having joint insecticidal and bactericidal action and comprising an aqueous solution containing 5–10% by weight of a chlorinated phenylbenzylether, 5–10% by weight of a bactericidal compound, 10–30% by weight of an emulsifier and 10–20% by weight of a lower alcohol.

8. A composition having joint insecticidal and bactericidal action and comprising a chlorinated phenyl benzyl ether, a phenol, and alkali metal salt of a sulphonated hydrocarbon.

9. A composition having joint insecticidal and bactericidal action and comprising in admixture a chlorine substituted phenyl-benzyl ether having 1 to 5 chlorine atoms substituted in the phenyl group and at least 1 chlorine atom substituted in the benzyl group, a bactericidal compound selected from the class consisting of the phenols, alkyl and halogen substituted phenols and cation-active quaternary ammonium compounds which contain at least one long chain hydrocarbon residue linked to the coordination center, an emulsifying agent and water.

10. A composition as set forth in claim 9, wherein the proportion of the chlorine substituted phenyl-benzyl ether is in the range of 5 to 10%, that of the bactericidal compound is in the range of 5 to 10% and that of the emulsifying agent is in the range from 10 to 30%.

References Cited in the file of this patent

UNITED STATES PATENTS

| 2,341,657 | Rosenmund | Feb. 15, 1944 |
| 2,558,942 | Eagleson | July 3, 1951 |

FOREIGN PATENTS

| 701,104 | Germany | Dec. 5, 1940 |

OTHER REFERENCES

Cranham et al.: Chemistry and Industry, November 7, 1953, pp. 1206–1207.

UNITED STATES PATENT OFFICE

CERTIFICATE OF CORRECTION

Patent No. 2,817,622                                      December 24, 1957

Albert Obladen et al.

It is hereby certified that error appears in the printed specification of the above numbered patent requiring correction and that the said Letters Patent should read as corrected below.

Column 3, line 7, for "suphonates" read -- sulphonates --; line 14, for "acid" read -- said --; line 31, for "5-1%" read -- 5-10% --; column 6, line 35, for "atmos" read -- atoms --.

Signed and sealed this 16th day of February 1960.

(SEAL)
Attest:

KARL H. AXLINE                                              ROBERT C. WATSON
Attesting Officer                                           Commissioner of Patents